A. ASSERETO AND L. CACCIOPPOLI.
PLANT FOR UTILIZING PULVERIZED SOLID FUELS.
APPLICATION FILED MAY 15, 1919.

1,420,904. Patented June 27, 1922.

Inventors:
Andrea Assereto and Lorenzo Caccioppoli
By Lawrence Langner.
Atty.

UNITED STATES PATENT OFFICE.

ANDREA ASSERETO AND LORENZO CACCIOPPOLI, OF SAVONA, ITALY.

PLANT FOR UTILIZING PULVERIZED SOLID FUELS.

1,420,904.  Specification of Letters Patent.  Patented June 27, 1922.

Application filed May 15, 1919. Serial No. 297,384.

*To all whom it may concern:*

Be it known that we, ANDREA ASSERETO and LORENZO CACCIOPPOLI, subjects of the King of Italy, and residents of Savona, in the Province of Genoa, Italy, have invented certain new and useful Improvements in Plants for Utilizing Pulverized Solid Fuels, of which the following is a specification.

Plants are known for burning pulverized solid fuels in which the dust, while falling through a feeding duct, is driven into a combustion chamber by an air blast so as to form a mixture which is burnt inside said chamber.

The present invention has for its object certain improvements in the above described plants whereby the construction is simplified and the accumulation and storing of fuel in pulverized condition is avoided, the mixture of air and fuel taking place in a suitable chamber and the mixture being held in agitation in said chamber prior to being driven into the furnace so that the relative proportions of air and fuel may be modified at will in order to obtain the greatest efficiency with different kinds of fuel.

The invention is illustrated in the accompanying drawings, in which:—

Figure 1:
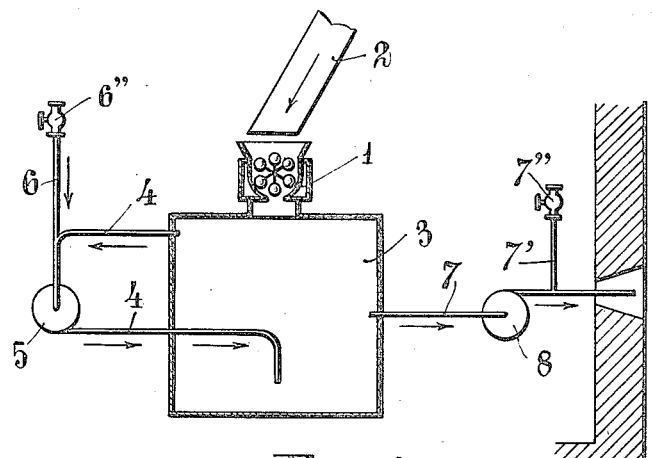
Figure 1 is a diagram of a construction adapted to feed a single nozzle.

Referring to Fig. 1, the plant comprises a mill or pulverizing apparatus 1 of any suittable and known type, to which the fuel is supplied through a duct 2, the pulverized fuel passing from said mill into a chamber 3. Into this chamber extend both ends of a U-shaped duct 4 having at a point intermediate its ends a fan or propeller 5 provided on its suction side with an air intake 6 having a controlling valve 6''. Communicating with said chamber 3 is a duct 7 leading to an exhauster 8 which drives the mixture to a nozzle opening into the furnace. Said nozzle may be of any known type and may be provided with an air intake 7' having a controlling valve 7'' adapted to admit additional air for the purpose of supplying the whole amount of air required for the full combustion of the mixture.

It is obvious that by suitably adjusting the output of the pulverizing apparatus 6 and valve 6'' a mixture having the required composition is obtained in the chamber 3, said mixture being continuously agitated by operation of fan 5 which draws air from chamber 3 and drives the same air, mixed with additional air entering through intake 6 and valve 6'', into the same chamber. Therefore, exhauster 8 draws from said chamber a thoroughly mingled mixture, the constituents of which are in the required relative proportions, and drives the same to the nozzle, at which point there may be added to said mixture the additional air required for its full combustion by means of the intake 7' and valve 7''. Thus the best conditions for a full utilization of the fuel may be obtained because the relative proportions of the mixture made in the chamber 3 may be easily modified.

Figure 2:
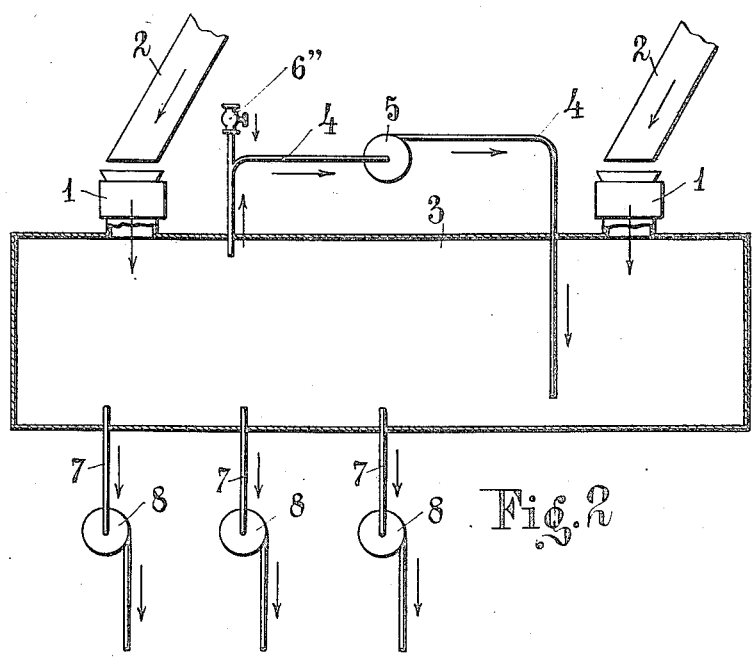
Figure 2 shows a construction in which a plurality of nozzles are fed from a single chamber.

The operation of the plant in the case where it is intended to supply a plurality of nozzles or furnaces is the same as above described. As shown in Fig. 2, a single chamber 3 may be used for producing the mixture, this chamber being fed by a plurality of mills or pulverizing apparatus and being provided with one or more mixing propellers or fans 5 and ducts 4 each having an air intake 6 and a valve 6''. A number of ducts 7 are connected with said chamber, the same leading to exhausters 8 which drive the mixture to the corresponding nozzles.

In any case, according to this invention, pulverized solid fuels may be utilized by means of a very simple and cheap plant. At the same time the liability to dangers and obstructions is removed because the fuel itself is not permitted to rest or accumulate in the pipes but is kept in a state of continual agitation in the chamber 3.

Having now described our invention, what we desire to secure by Letters Patent is:—

1. In a plant for burning pulverized solid fuel, the combination of a mixing chamber, means above said chamber for feeding pulverized fuel thereto, means for generating a circulation of air and fuel mixture in said chamber, said means being constructed and arranged to continuously exhaust the mixture from said chamber and return the same undiminished thereto, a duct leading directly from said chamber to a burner, and means in said duct to exhaust the mixture of fuel and air from said chamber and to drive it to said burner.

2. In a plant for burning pulverized solid fuel, the combination of a mixing chamber, means above said chamber for feeding pulverized fuel thereto, a fan having its suction and exhaust ducts communicating with said chamber, adjustable means for admitting air to said suction duct of said fan, a pipe leading directly from said chamber to a burner, and means in said pipe for exhausting the mixture from said chamber and driving it to the burner.

3. In a plant for burning pulverized solid fuel, the combination of a mixing chamber, means for feeding pulverized fuel thereto, a fan having its suction and exhaust ducts communicating with said chamber, adjustable means for admitting air to said suction duct of said fan, a pipe leading directly from said chamber to a burner, means in said pipe for exhausting the mixture from said chamber and driving it to the burner, and adjustable means for admitting air to said pipe.

Signed at Genoa, Kingdom of Italy, this 11th day of April, A. D. 1919.

ANDREA ASSERETO.
LORENZO CACCIOPPOLI.